United States Patent
Barcena et al.

(10) Patent No.: US 6,445,395 B1
(45) Date of Patent: *Sep. 3, 2002

(54) METHOD AND APPARATUS FOR RADIOMETRICALLY ACCURATE TEXTURE-BASED LIGHTPOINT RENDERING TECHNIQUE

(75) Inventors: Luis A. Barcena; Nacho Sanz-Pastor, both of Sunnyvale; Javier Castellar, Santa Clara, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,418

(22) Filed: Nov. 6, 2000

Related U.S. Application Data

(63) Continuation of application No. 09/087,380, filed on May 29, 1998, now Pat. No. 6,163,320.

(51) Int. Cl.[7] .............................................. G06T 11/00
(52) U.S. Cl. ..................................... 345/582; 345/587
(58) Field of Search ................................ 345/430, 582, 345/583, 584, 585, 586, 587, 588, 589, 689, 764, 855, 851, 552, 562, 698, 426, 427, 421; 382/294, 293; 708/442

(56) References Cited

U.S. PATENT DOCUMENTS

| | | | |
|---|---|---|---|
| 4,325,639 A | 4/1982 | Richter | 356/376 |
| 4,873,515 A | 10/1989 | Dickson et al. | 340/728 |
| 4,949,280 A | 8/1990 | Littlefield | 364/518 |
| 5,010,515 A | 4/1991 | Torborg, Jr. | 364/900 |
| 5,338,200 A | 8/1994 | Olive | 434/43 |
| 5,363,475 A | 11/1994 | Baker et al. | 395/122 |
| 5,550,960 A | 8/1996 | Shirman et al. | 395/130 |
| 5,649,173 A | 7/1997 | Lentz | 395/513 |
| 5,682,520 A | 10/1997 | Fang et al. | 395/502 |
| 5,742,749 A | 4/1998 | Foran et al. | 395/126 |
| 6,018,350 A | 1/2000 | Lee et al. | 345/426 |
| 6,064,393 A | 5/2000 | Lengyel et al. | 345/427 |
| 6,163,320 A | * 12/2000 | Barcena et al. | 345/430 |

* cited by examiner

Primary Examiner—Jeffery Brier
Assistant Examiner—Thu-Thao Havan
(74) Attorney, Agent, or Firm—Woodcock Washburn LLP

(57) ABSTRACT

A method and apparatus for rendering lightpoints is provided. For the method of the present invention, a programmer creates a series of texture maps. Each texture map approximates the lobe of a lightpoint at a respective distance from the lightpoint. Each texture map includes transparency texture information. This allows the lightpoint to correctly model fog and other atmospheric conditions. The series of texture maps are encoded in a mipmap associated with the lightpoint. During use, a simulation environment renders the lightpoint using a billboarding technique. The billboarding technique keeps the lobe of the lightpoint oriented towards the eye point. The simulation environment dynamically tracks the distance from the lightpoint to the eye point. Each time the distance changes, the simulation environment selects an appropriate texture map from the mipmap. The appropriate texture map is the texture map that correctly depicts the lightpoint at the distance between the eye point and the lightpoint. In cases where no appropriate texture map exists, the simulation environment generates an interpolated texture map. The simulation environment then applies the selected or generated texture map during rendering of the lightpoint. The result is that the lightpoint is realistically depicted over a wide range of distances.

15 Claims, 3 Drawing Sheets

METHOD AND APPARATUS FOR RADIOMETRICALLY ACCURATE TEXTURE-BASED LIGHTPOINT RENDERING TECHNIQUE

CROSS REFERENCE TO RELATED APPLICATIONS

This application is a continuation of prior application Ser. No. 09/087,380, filed on May 29, 1998, now U.S. Pat. No. 6,163,320.

FIELD OF THE INVENTION

The present invention relates generally to systems for computer graphics. More specifically, the present invention includes a method and apparatus for realistically rendering lightpoints included in simulation environments, such as flight simulators.

BACKGROUND OF THE INVENTION

Lightpoints are small sources of light such as stars, beacons, and runway lights. Depicting lightpoints in a realistic manner is, an important part of making three-dimensional images believable. Realistic depiction of lightpoints is difficult, however, when the intended application is a simulation environment, such as a flight simulator or virtual reality environment. This difficulty is caused by the need to constantly adjust the appearance of lightpoints as they shift in relation to the viewer's eye.

As an example, consider the case of a. flight simulator depicting a nighttime approach to a runway. Typical runways are surrounded by runway lights. For the flight simulator, each of these runway lights is a lightpoint. These lightpoints must be rendered in a realistic fashion from the point where they first become visible to the point where the runway is beneath the plane. Clearly, this involves a great change in perspective. For the simulation to be believable, the runway lights must have a realistic, appearance over this entire perspective change.

Traditionally, lightpoints have been rendered as collections of raster pixels. The collections of pixels produce a fixed size image that does not change to account for changes in perspective. As a result, lightpoints that appear to be correctly sized when viewed from a distance will appear to shrink (in relation to background images) as they are approached. Rendering light points as collections of raster pixels also tends to produce aliasing within the pixels of the lightpoints. Aliasing results because lightpoints typically have a round or elliptical cross-section. This cross-section must be mapped to square pixels. As a result, edges of the cross-section may fall between adjacent pixels and need to contribute partially to both pixels. The fixed size and aliasing produced by rendered lightpoints as collections of raster pixels compromises the realism of this technique.

An alternative is to render lightpoints as calligraphic images. The calligraphic images are overlaid onto a background image produced using normal raster techniques. Use of calligraphically rendered lightpoints eliminates the aliasing present in lightpoints created using raster techniques. Unfortunately, calligraphic rendering requires specialized hardware. As a result, the use of calligraphic techniques may be impractical for many simulation environments.

Thus, a need exists for a high performance method for rendering lightpoints that avoids or reduces lightpoint shrinking and pixel aliasing. This need is especially important for simulation environments, such as flight simulators and for highly realistic virtual reality systems.

SUMMARY OF THE INVENTION

An embodiment of the present invention includes a method and apparatus for rendering radiometrically accurate texture-based lightpoints. For the method of the present invention, programmer creates a series of texture maps for each type of lightpoint. The programmer creates the texture maps for a lightpoint to approximate cross-sections of the lightpoint's lobe at different distances from the lightpoint. The texture maps for a cross-section preferably include separate components for blue, green and red textures as well as a transparency or 'alpha' texture. The entire series of texture maps for a lightpoint are encoded in a data structure known as a mipmap.

The visual simulation environment in which the lightpoints are displayed uses a billboarding technique to render each lightpoint. The billboarding technique causes the lobe of each lightpoint to be oriented towards the viewer's eye (the eye point). As the position of the eye point changes, the visual simulation environment adjusts the billboarding technique so that the lobes remain focused towards the viewer.

The visual simulation environment textures each lightpoint so that the lightpoint appears realistic. To texture a lightpoint, the visual simulation environment calculates the distance from the lightpoint to the viewer's eye and the angle of rotation of t he lightpoint. The visual simulation environment then determines if an appropriate texture map for this distance and angle of rotation is included in the lightpoint's mipmap. If an appropriate texture map exists, the visual simulation environment selects the texture map for use with the lightpoint. If no appropriate texture map is found, the visual simulation environment generates a texture map. The visual simulation environment generates the texture map by interpolating between the two texture maps within the mipmap that most closely match the distance from the lightpoint to the viewer's eye and the lightpoint's angle of rotation. The visual simulation environment then applies the selected or generated texture map to the underlying image of the lightpoint. The texture map gives the lightpoint a realistic appearance, that matches the distance between the lightpoint and the viewer's eye.

In this way, the present invention provides a high performance method for rendering lightpoints that avoids or reduces lightpoint shrinking and pixel aliasing. The method is especially desirable because it functions in traditional raster environments without the need for specialized display hardware. The method provides high-performance rendering of realistic lightpoints for all hardware platforms that support mipmap based texturing.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
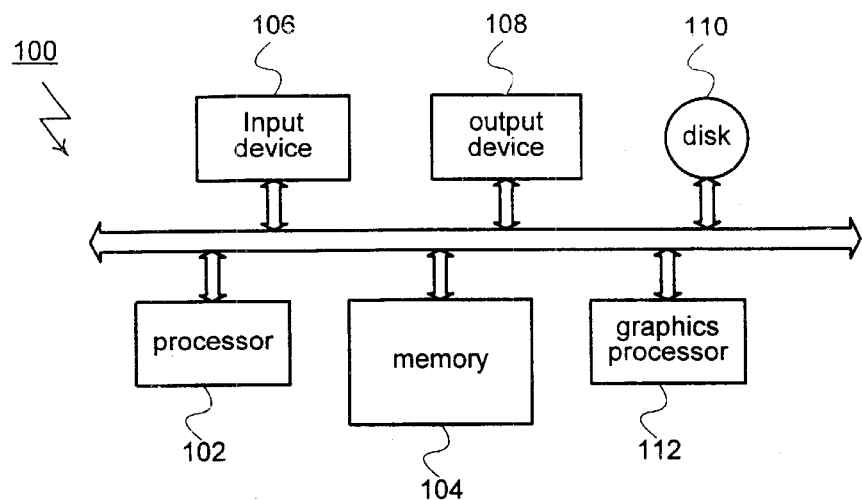
FIG. 1 is a block diagram of a host computer system shown as an exemplary environment for an embodiment of the present invention.

In FIG. 1, a computer system 100 is shown as a representative environment for the present invention. Structurally, computer system 100 includes a processor, or processors 102, and a memory 104. An input device 106 and an output device 108 are connected to processor 102 and memory 104. Input device 106 and output device 108 represent a wide range of varying I/O devices such as disk drives, keyboards, modems, network adapters, printers and displays. Each node 102 may also includes a disk drive 110 of any suitable disk drive type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and attributes to displayable output.

LIGHTPOINT RENDERING METHOD

Figure 2:
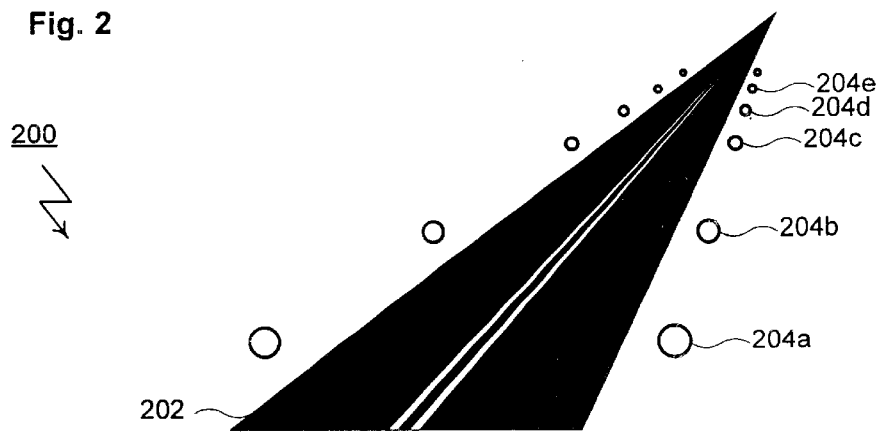
FIG. 2 is a block diagram of an image showing a series of runway lights as rendered by an embodiment of the present invention.

An embodiment of the present invention includes a method and apparatus for rendering radiometrically accurate texture-based lightpoints. The method and apparatus of the present invention are better understood by reference to FIG. 2 where a representative image is shown and generally designated 200. Image 200 depicts a runway 202 surrounded by a series of runway lights, of which runway lights 204a through 204e are representative. Image 200 is shown with an eye point 206. Eye point, 206 represents the position at which image 200 is viewed. Eye point 206 is intended to be movable within image 200. This means that components of image 200, including runway 202 and runway lights 204 may be viewed: from a range of positions. The method and apparatus of the present invention allow lightpoints, such as runway lights 204, to be realistically rendered as eye point 206 moves within image 200.

Figure 3:
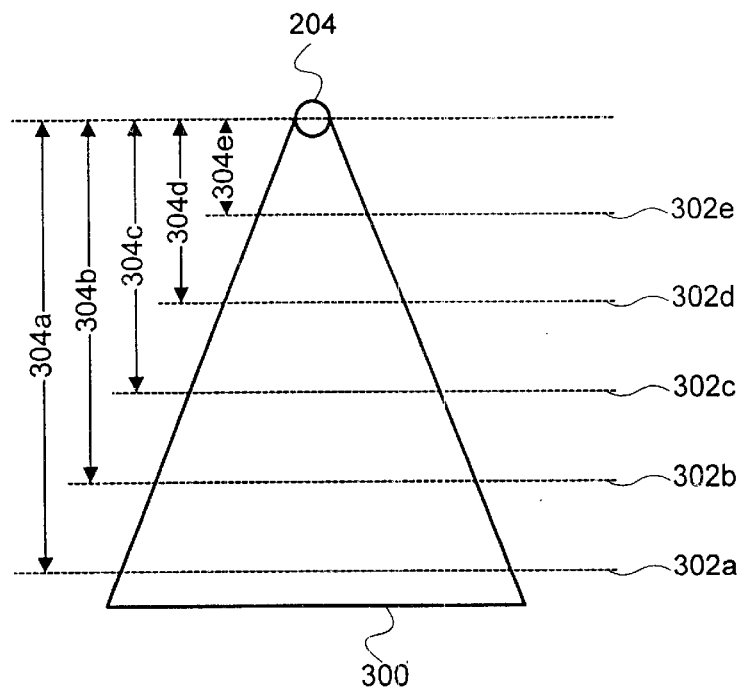
FIG. 3 is a block diagram showing a model of a runway light as used by an embodiment of the present invention.

For the purposes of the present invention, a model is created for each type of lightpoint that is to be rendered. The modeling process is better understood by reference to the representative runway light 204 of FIG. 3. As shown in FIG. 3, runway light 204 emits a cone of light, or lobe 300. For the modeling process, lobe 300 is subdivided by a series of cross-sections, of which cross-sections 302a through 302e are representative. Each cross-section 302 is positioned at a respective distance 304a through 304e from runway light 204. Typically, the number of cross sections 302 and their distances from runway light 204 will be chosen by a programmer. The shape of lobe 300 may be estimated or based on known optical principals. Preferably, however, the shape of lobe 300 is based on actual physical data that describes an actual runway light 204 of the type that is to be rendered.

Starting with runway light 204 and lobe 302, a programmer creates a series of texture maps. Each texture map represents the characteristics of a cross-section 302. This means that each texture map is configured to represent the brightness, dispersion and shape of lobe 302 at a respective distance 304 from runway light 204. For the purposes of the present invention, it is preferable to encode the texture maps created for a particular lightpoint in a way that is both compact and easily accessible. An implementation that accomplishes both of these tasks is the use of a trilinear mipmap of the form shown in FIG. 4 and generally designated 400.

Figure 4:
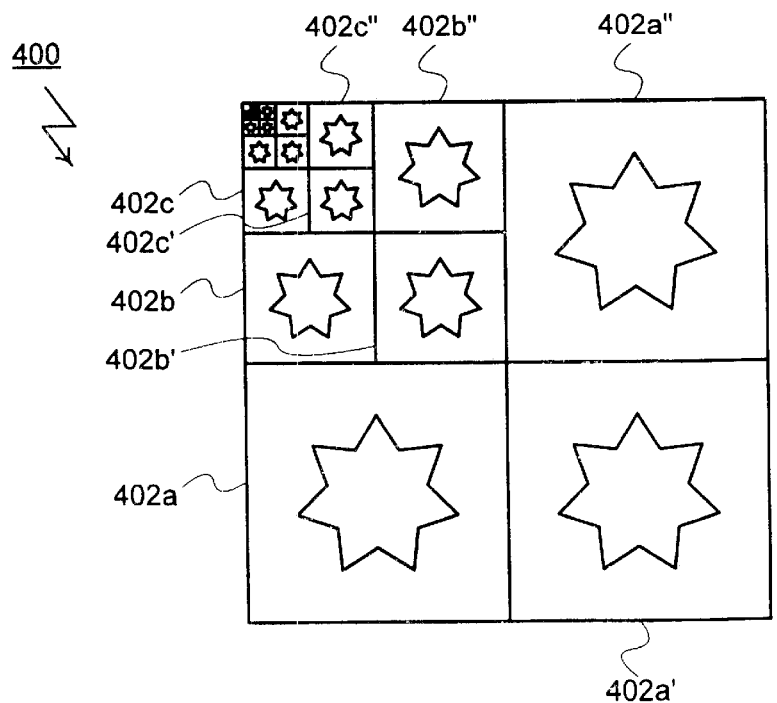
FIG. 4 is a block diagram of a trilinear mipmap as used by an embodiment of the present invention.

Mipmap 400 includes a series of levels, each composed of three square pixel blocks. In FIG. 4, the first level includes pixel blocks 402a, 402a' and 402a". The second level includes pixel blocks 402b, 402b' and 402b". The third level includes pixel blocks 402c, 402c' and 402c". The blocks included in each level are dimensioned to contain four times as many pixels as the blocks included in the next adjacent level. Thus, blocks 402a, 402a' and 402a" contain four times as many pixels as blocks 402b, 402b' and 402b". The blocks within each level are separated according to color: red, green and blue. Each level contains a complete texture map, separated into red, blue and green components. The texture map of each level corresponds to lobe 300 at a respective distance 304. Thus, blocks 402a, 402a' and 402a" are the red, green and blue components of a texture map for cross-section 302a of lobe 300 at distance 304a. Blocks 402b, 402b' and 402b" are the red, green and blue components of a texture: map for cross-section 302b of lobe 300 at distance 304b, and so on.

Mipmap 400 is an effective data structures for storing texture maps that include red, green and blue components. For some embodiments of the present invention, it is desirable to store additional components within each texture map. An example is transparency or alpha channel data. The alpha channel component within a texture map simulates conditions, such as fog, that alter the visual representation of lobe 300. Adding additional components is generally accomplished by splitting the structure of mipmap 400 so that red blocks 402a, 402b and 402c are stored in a first area, blue blocks 402a', 402b' and 402c' are stored in a second area and green blocks 402a", 402b" and 402c" are stored in a third area. A fourth areas stores corresponding blocks for alpha channel data. Texture maps are constructed by retrieving corresponding blocks from each of the four areas.

The process of creating the texture maps for each type of lightpoint is typically performed by a programmer. The resulting texture maps, preferably arranged as elements with mipmaps, are saved within a file or other durable record.

Figure 5:
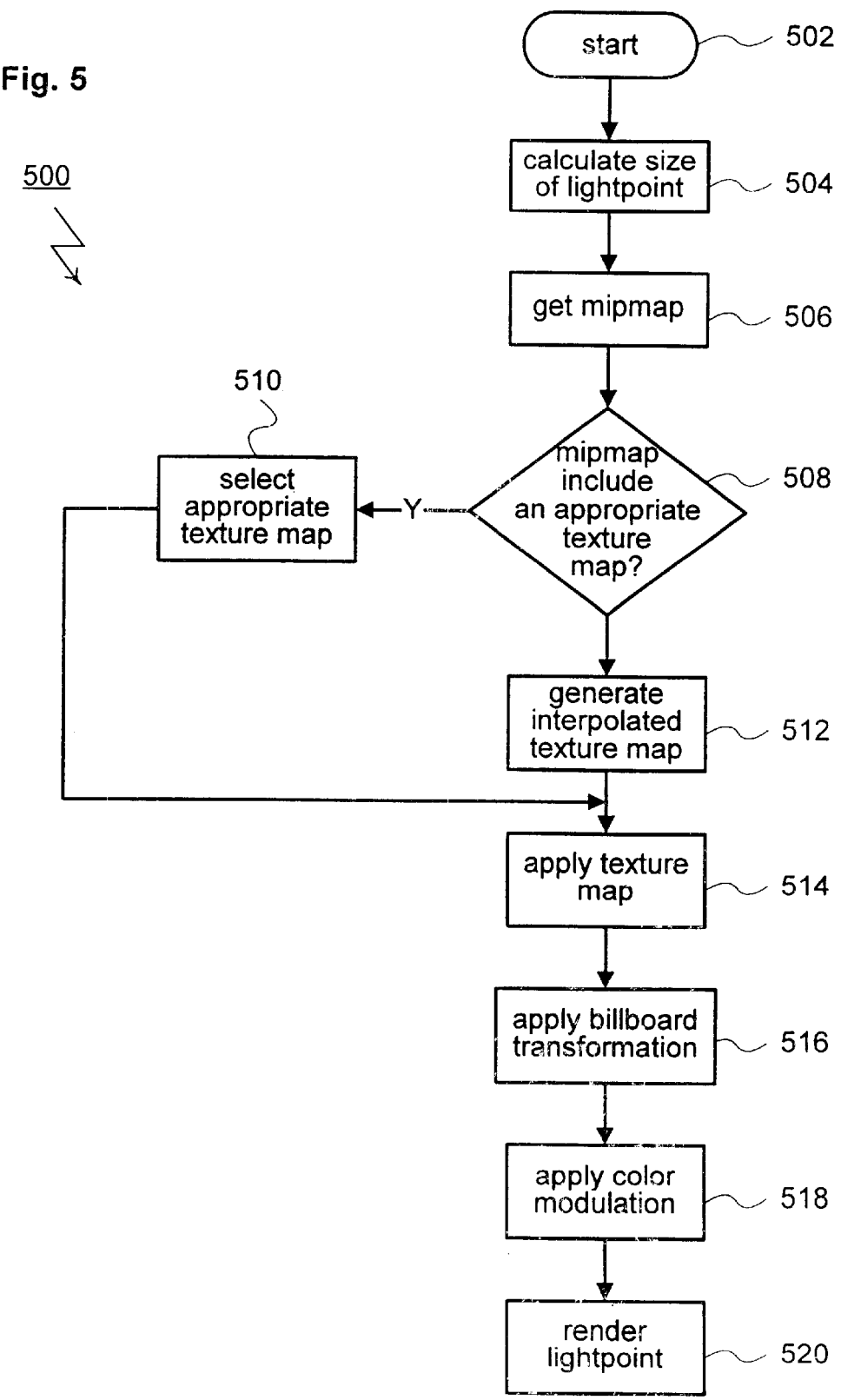
FIG. 5 is a flowchart showing the steps associated with rendering a representative lightpoint as executed by an embodiment of the present invention.

The steps associated with rendering a lightpoint, using a mipmap 400 generated by this modeling process, are shown as method 500 of FIG. 5. In the description of FIG. 5, it should be appreciated that the lightpoint being rendered is represented by one of more graphics primitives. Method 500 is performed by a computer system, such as computer system 100, as part of a visual simulation environment, such as a flight simulator.

Method 500 begins, symbolically, with step 502. In step 504, the visual simulation environment calculates the onscreen size of the lightpoint to be rendered. The onscreen size is controlled by several factors including the distance from the lightpoint to eye point 206 and the angle of the lightpoint. For the purposes of this example, it will be assumed that the lightpoint being rendered is runway light 204b of image 200. In step 506, the visual simulation environment retrieves the mipmap 400 generated for lightpoints of the type represented by runway light 204b.

In step 508, the visual simulation environment uses the size calculated in step 504 to determine if an appropriate texture map exists in the retrieved mipmap 400. In this context, a texture map is appropriate if its size matches the size calculated in step 504. The two-dimensional nature of texture maps means that each texture map actually has two sizes: a height and a width. For the purposes of the present invention, a texture map matches the size of a lightpoint if the smallest dimension (height or width) matches the calculated size of the lightpoint. In the positive case (i.e., where the mipmap 400 includes an appropriate texture map), execution of method 500 continues at step 510. In step 510, the visual simulation environment selects the appropriate texture map from mipmap 400.

In the negative case (i.e., where the mipmap 400 does not include an appropriate texture map), execution of method 500 continues at step 512. In step 512, the visual simulation environment generates an interpolated texture map. The visual simulation environment generates the interpolated texture map by selecting two texture maps from mipmap 400. The two texture maps are the texture maps having sizes that are closest to the size calculated in step 504. One of these texture maps will be larger than the size calculated in step 504. The other will be smaller than the size calculated in step 504. The visual simulation environment constructs the interpolated texture map to be an intermediate between these two texture maps.

After executing step 510 or step 512, the visual simulation environment continues execution of method 500 at step 514. In step 514, the visual simulation environment applies the selected (in step 510) or generated (in step 512) texture map to the runway light 204b. The visual simulation environment applies the texture map to the graphics primitive or primitives that describe the runway light 204b. This transforms the visual representative of the runway light 204b to reflect the brightness, dispersion and shape of lobe 302 described by the texture map. Effectively, runway light 204b is transformed to have a realistic appearance when viewed from eye point 206.

In step 516, the visual simulation environment applies a billboarding transformation to the runway light 204b. The visual simulation environment applies the billboarding transformation to the graphics primitive or primitives that describe the runway light 204b. The billboarding transformation rotates the runway light 204b so that lobe 300 points directly at eye point 206.

In step 518, the visual simulation environment applies, if necessary, a color modulation to the runway light 204b. The visual simulation environment applies the color modulation to the graphics primitive or primitives that describe the runway light 204b. The color modulation colors runway light 204b to simulate the effect of rotating beacons or lights that have different colors for different directions.

In step 520, the visual simulation environment renders the graphics primitive or primitives that describe the runway light 204b. Rendering transforms the primitives that describe runway light 204b into data suitable for display. Method 500 is repeated for each of the lightpoints included in a image (e.g., all of the runway lights 204 included in image 200). Method 500 is also repeated each time that the position of eye point 206 changes. This allows the image of each lightpoint to be dynamically updated to reflect changing simulation conditions.

In this way, the present invention provides a high performance method for rendering lightpoints that avoids or reduces pixel aliasing. The method is especially desirable because it functions in traditional raster environments without the need for specialized display hardware. The method provides high-performance rendering of realistic lightpoints for all hardware platforms that support mipmap based texturing.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for rendering a lightpoint, the lightpoint having an associated series of texture maps, each texture map created to modify the lightpoint for viewing from a respective distance, the method comprising the steps, performed by a processor, of:

calculating an onscreen size of the lightpoint;

selecting or generating a texture map from the series of texture maps based on the calculated size; and applying the selected or generated texture map during rendering of the lightpoint.

2. A method as recited in claim 1 further comprising the step of dynamically reorienting the lightpoint so that the lobe of the lightpoint is directed at the eye point.

3. A method as recited in claim 1 further comprising the step of applying a color modulation to the lightpoint.

4. A method as recited in claim 1 wherein each texture map in the series of texture maps approximates the lobe of the light point at a respective distance from the lightpoint.

5. A method as recited in claim 1 wherein each texture map in the series of texture maps includes a transparency texture.

6. A computer program product comprising:

a computer usable medium having computer readable code embodied therein for rendering a lightpoint, the computer program product comprising:

computer readable data storing a series of texture maps, each texture map created to modify the lightpoint for viewing from a respective distance;

first computer readable program code devices configured to cause a computer system to calculate an onscreen size of the lightpoint;

second computer readable program code devices configured to cause a computer system to select or generate a texture map, from the series of texture maps based on the calculated onscreen size; and third computer readable program code devices configured to cause a computer system to apply the selected texture map during rendering of the lightpoint.

7. A computer program product as recited in claim 6 which further comprises eighth computer readable program code devices configured to cause a computer system to dynamically reorient the lightpoint so that the lobe of the lightpoint is directed at the eye point.

8. A computer program product as recited in claim 6 which further comprises tenth computer readable program code devices configured to cause a computer system to apply a color modulation to the lightpoint.

9. A computer program product as recited in claim 6 wherein each texture map in the series of texture maps approximates the lobe of the light point at a respective distance from the lightpoint.

10. A method as recited in claim 6 wherein each texture map in the series of texture maps includes a transparency texture.

11. A system for rendering a lightpoint, the lightpoint having an associated series of texture maps, each texture map created to modify the lightpoint for viewing from a respective distance, the method comprising the steps, performed by a processor, of:
- means for calculating an onscreen size of the lightpoint;
- means for selecting or generating a texture map from the series of texture maps based on the calculated onscreen size; and
- means for applying the selected texture map during rendering of the lightpoint.

12. A system as recited in claim 11 which further comprises means for dynamically reorienting the lightpoint so that the lobe of the lightpoint is directed at the eye point.

13. A system as recited in claim 11 which further comprises means for applying a color modulation to the lightpoint.

14. A system as recited in claim 11 wherein each texture map in the series of texture maps approximates the lobe of the light point at a respective distance from the lightpoint.

15. A system as recited in claim 11 wherein each texture map in the series of texture maps includes a transparency texture.

* * * * *